Jan. 2, 1934.  A. C. PEGG  1,942,036
METHOD OF AND APPARATUS FOR PROJECTING
MOTION PICTURES ACCOMPANIED BY SOUND
Original Filed July 6, 1931

Inventor:
Albert C. Pegg,
by: [signature]
Attorney.

Patented Jan. 2, 1934

1,942,036

UNITED STATES PATENT OFFICE 1,942,036

METHOD OF AND APPARATUS FOR PROJECTING MOTION PICTURES ACCOMPANIED BY SOUND

Albert C. Pegg, Los Angeles, Calif.

Application July 6, 1931, Serial No. 548,907
Renewed May 31, 1933

4 Claims. (Cl. 88—16.2)

My invention has for its object to depict simultaneously from a single source of projection, a motion picture upon two or a plurality of screens, one for illustration being the usual screen as used in a motion picture theater or other exhibition place and the other a screen of any suitable size, placed in the lobby or entrance of the theater or at any suitable distance from the main screen and to accompany one or both of said displays with reproduced synchronized sound effects also originating from a single source of production. More particularly this invention is an improvement upon the method and apparatus disclosed in my companion application for patent filed May 26, 1931, bearing Serial Number 540,023, this specific improvement having reference to the manner in which the sound effects are reproduced in conjunction with the auxiliary motion picture reproduction.

Among the objects of this invention more specifically is the reproduction of sound effects in conjunction with an auxiliary display from the original source without contacting any of the mechanical parts of the apparatus used at the original source of production. Therefore this improvement is designed to produce sound effects adjoining and in synchronism with an auxiliary motion picture display simultaneously but out of mechanical contact with an original projection of a motion picture and its synchronized sound effects. Another object of the invention is simplicity and effectiveness in construction, by which my improvement is carried into practice. As a result of my invention, sound effects are reproduced for use in conjunction with an auxiliary apparatus without having to make any visible mechanical connection with the original source and without diminishing to any appreciable extent the efficiency of the original reproduction.

Figure 1:
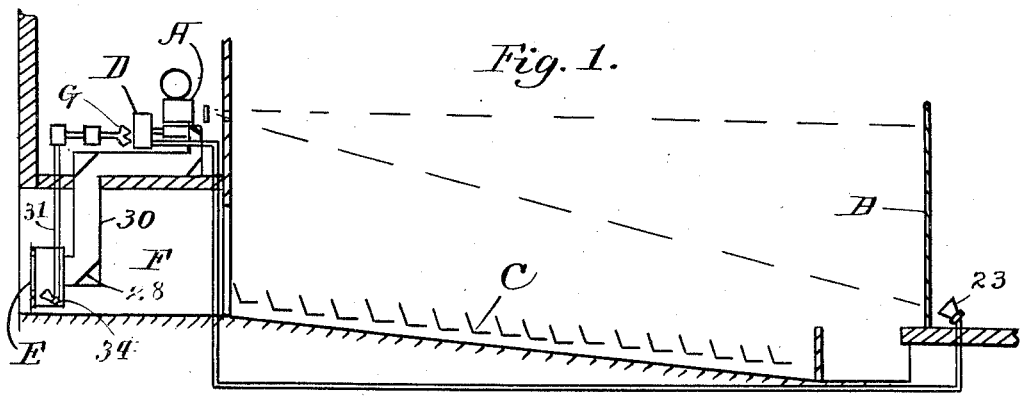
Figure 2:
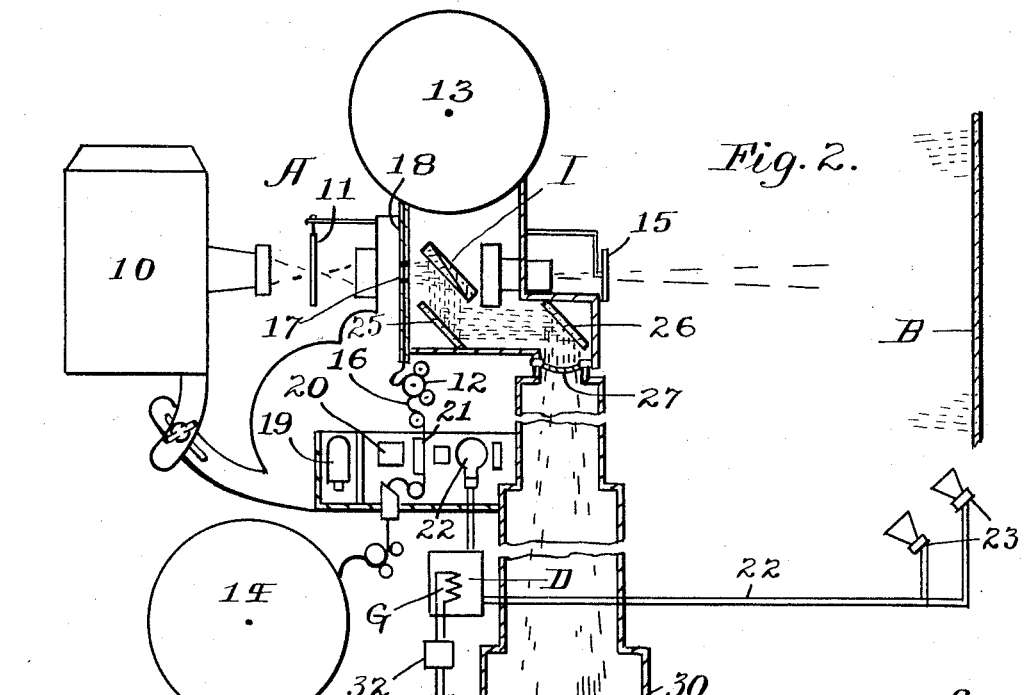

In the accompanying drawing forming part of this specification, Fig. 1 is a diagrammatic view representing a theater structure showing my improved apparatus installed therein; Fig. 2 is a diagrammatic side elevation, partly in section and broken away, showing my improved projecting and sound reproducting apparatus by the use of which my improvement is carried into practice, and Fig. 3 is a diagrammatic view showing part of an audio circuit and the impedence coil forming what I have chosen to term a detector for reproducing sound effects in conjunction with the auxiliary apparatus forming part of my invention.

Figure 3:
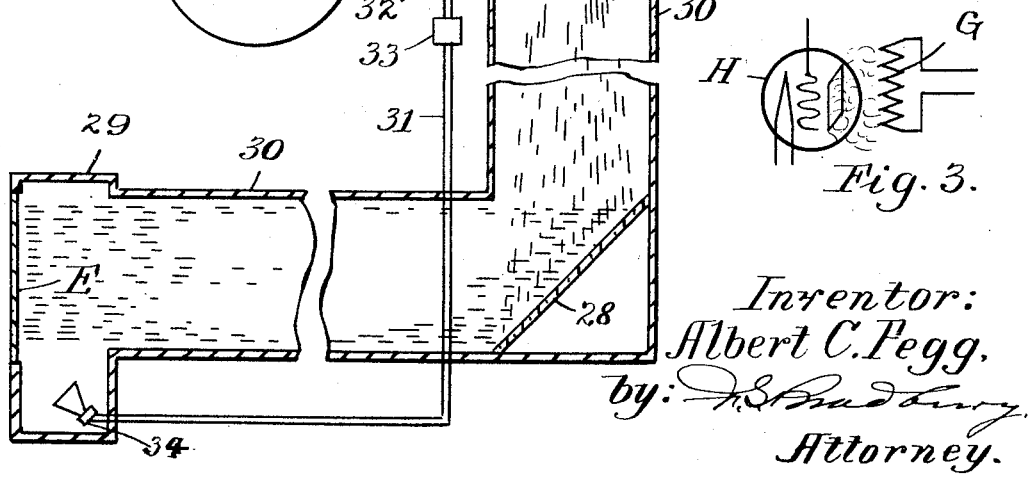

In the drawing, and particularly with reference to Figs. 2 and 3, A indicates an ordinary motion picture projector having the usual lamp house 10, condenser 11, film stepping mechanism 12, film reel magazines 13 and 14 and revolving disc shutter 15, said stepping mechanism and shutter being operated in synchronism to move the film 16 at uniform velocity across the path of the projecting beam of light passing through aperture 17 in aperture plate 18 to project motion pictures upon the suitably distanced main screen B, in a theater structure C (see Fig. 1) or other exhibition place. This mechanism may be of any desired construction, my invention being applicable for use with various types of projection. The feed mechanism 12 is also shown applied for moving the film past the exciting lamp 19, lens system 20, aperture plate 21, and a photoelectric cell 22 of any usual sound projection unit to reproduce sound from the sound track recorded on film 16 substantially in synchronism with the picture exhibited on the main screen B, through electrical conductor 22, amplifier D and ordinary microphones 23, the latter being suitably located adjacent to said main screen B.

The specific means by which my invention can be carried into practice may include either or both an auxiliary motion picture projector or an auxiliary sound projector. The auxiliary motion picture projector as shown, employs a split prism I, more specifically described in my companion application above identified, disposed across the optical axis of the motion picture projecting beam of light and adapted to intercept and reflect at an angle a portion of the beam of light and the motion picture without depreciating to any visible extent the efficiency of the main beam. Thus the main motion picture projecting beam of light is split by the prism and I have therefore chosen to term said prism a beam splitter. The split portion of the beam of light is shown reflected down upon a mirror 25, which in turn reflects the split beam horizontally into a second mirror 26 and the reflected split beam thence passes through a magnifying lens 27 and is cast downwardly into another mirror 28 and so on, by as many mirrors as is desired to ultimately cast the split beam upon an auxiliary screen E, (miniature or of any suitable size) located at any suitable distance remote from the main screen B. A suitable enclosure 29 and light obscuring tube 30 is provided for protecting the mirrors and magnifying lens 27 from external light from the projector to the auxiliary screen. The arrangement of the reflectors is such as to ultimately cast the image upon the auxiliary screen in upright position and not inverted. In practice the auxiliary screen has been employed to advantage in the entrance way or lobby F of a theater so as to advertise by displaying the motion picture or portions thereof, being shown in the theater although this invention is not restricted to this use alone within the spirit thereof.

Arranged for cooperation with the beam splitting projecting apparatus is an auxiliary sound projecting apparatus which comprises in detail as shown, an impedance induction coil G having an air core, placed in proximity to the amplifier D to be influenced by the audio circuit therein, said coil leading through the circuit conductors 31, voltage amplifier 32 and power amplifier 33 and connected with the microphone or loud speaker 34, placed in the chamber 29 of the auxiliary screen to reproduce the sound effects originating in the sound apparatus of the main projector in synchronism with the motion picture transmitted by the beam splitter. The amplifier D is of usual construction, containing the usual audio circuit. In Fig. 3 one of the audio tubes H in the audio circuit in the amplifier D is illustrated and the impedance coil G is shown associated in the field of influence of the tube to be influenced thereby, thus picking up the ethereal vibrations or undulations set up in the tube and transmitting them through appropriate amplifying means to the speaker, without contact mechanically with amplifier D or any other part of the apparatus. In use it is contemplated that the impedance coil G can be supported by a portable stand or any suitable support, not shown, for use and connected to the circuit 31 by a flexible conductor, also not shown.

Various modifications are contemplated within the scope of the following claims and without departing from the spirit of my invention.

I claim:

1. In combination with a main motion picture screen, a projector for casting a beam of motion picture reproducing light to reproduce a motion picture upon said screen, an electrical sound projector adapted to reproduce sound effects substantially in synchronism and in conjunction with the animation of the picture cast upon said main screen by said projector, and having an audio circuit, means for splitting the projecting beam of light, an auxiliary screen positioned remote from the main screen, means for projecting a split portion of the projecting beam on said auxiliary screen and means for duplicating said sound effects in conjunction and in synchronism with the animation of the picture cast upon the auxiliary screen having a detector placed in the field of said audio circuit to be influenced thereby and an audio amplifier for magnifying said duplicated sound effects.

2. In combination with a motion picture theater structure having a main screen, a seating area and main entrance, a projecting apparatus in said theater structure for reproducing motion pictures by a beam of light cast upon said screen, a sound projector to reproduce sound effects in conjunction and in synchronism with the pictures projected upon said screen having an audio circuit, an auxiliary screen positioned outside said theater structure and remote from said main screen to be viewed by outside observers, means for splitting said projecting beam of light, means for transmitting a split portion of said beam of light and reproducing motion pictures thereby upon said auxiliary screen simultaneously with the projection upon the main screen, and means for duplicating said sound effects in conjunction with the picture reproduced upon said auxiliary screen having a detector placed in the field of and out of contact with said audio circuit to be influenced thereby and an audio amplifier for magnifying said duplicated sound effects.

3. In combination with a motion picture theater, having a seating area, a main screen associated with said seating area, a main entrance way, an auxiliary miniature screen associated with said entrance way, a projector in said theater for reproducing pictures accompanied by sound from a combined picture and sound film, having means by which a projecting beam of light is split and cast partly upon said main screen and partly upon said auxiliary screen, whereby a single image is cast simultaneously upon the main screen to be viewed by an audience in said seating area and upon the miniature screen to be viewed by persons outside said theater, means having an audio circuit for reproducing sound effects from said film in conjunction with said main screen and means for inductively reproducing substantially without contact with said audio circuit said sound effects in conjunction with said auxiliary screen.

4. In combination with a motion picture theater having a seating area, a main screen associated with said seating area and a main entrance way, an auxiliary miniature screen associated with said entrance way, a projector in said theater for reproducing motion pictures accompanied by sound from a combined picture and sound film and having means by which a projecting beam of light is split and cast partly upon said main screen and partly upon said auxiliary screen, an audio circuit for reproducing sound effects in conjunction with said main screen having an audio tube and amplifying means, and an auxiliary circuit containing a sound reproducer in proximity to said miniature screen and an impedance within the field of influence of said audio tube adapted to pick up the ethereal vibrations and undulations set up by said tube and transmit them through said amplifying means whereby sound effects are reproduced in synchronism and conjunction with the motion picture displayed by said miniature screen.

ALBERT C. PEGG.